(12) United States Patent
France et al.

(10) Patent No.: US 10,321,284 B1
(45) Date of Patent: Jun. 11, 2019

(54) IN-PERSON ENCOUNTER SYSTEM AND METHOD OF USE

(71) Applicant: Stir7 LLC, Oklahoma City, OK (US)

(72) Inventors: Daniel J. France, Oklahoma City, OK (US); Jaden M. Lemmon, Oklahoma City, OK (US); Tommy Yi, Oklahoma City, OK (US); Jaret T. Martin, Stillwater, OK (US)

(73) Assignee: STIR7 LLC, Oklahoma City, OK (US)

( * ) Notice: Subject to any disclaimer, the term of this patent is extended or adjusted under 35 U.S.C. 154(b) by 4 days.

(21) Appl. No.: 15/961,528

(22) Filed: Apr. 24, 2018

Related U.S. Application Data

(60) Provisional application No. 62/597,551, filed on Dec. 12, 2017.

(51) Int. Cl.
*H04W 4/21* (2018.01)
*H04W 4/02* (2018.01)
(Continued)

(52) U.S. Cl.
CPC .......... *H04W 4/21* (2018.02); *G06F 16/9535* (2019.01); *G06Q 50/01* (2013.01); *H04L 67/18* (2013.01);
(Continued)

(58) Field of Classification Search
CPC ....... H04W 4/02; H04W 64/00; H04W 4/023; H04W 4/21; H04W 4/021; H04W 4/025; H04W 4/14; H04W 8/18; H04W 4/60; H04W 76/14; H04W 4/022; H04W 4/027; H04W 92/08; H04W 76/11; H04W 48/04; H04W 12/08; H04W 36/32;
(Continued)

(56) References Cited

U.S. PATENT DOCUMENTS 6,539,232 B2 * 3/2003 Hendrey ................. H04W 4/02
455/456.1
8,295,851 B2 10/2012 Finnegan et al.
(Continued)

FOREIGN PATENT DOCUMENTS

WO 2010/0001181 10/2010

OTHER PUBLICATIONS

First Dating App on the App Store, https://itunes.apple.com/us/app/first-the-first-real-dating-app/id1222111537, Sep. 24, 2017.
(Continued)

*Primary Examiner* — Nimesh Patel
(74) *Attorney, Agent, or Firm* — Dunlap Codding, P.C.

(57) ABSTRACT

A technological solution to the problem of meeting people solely through electronic communication is described. The technological solution includes receiving location data from a first user system a second user system of a potential encounter within a venue, and delivering a nudge from the first user system to the second user system. The nudge is a canned request to engage in an in-person communication for users associated with the first user system and the second user system. Upon confirmation of the nudge, and receiving confirmation of a human-to-human interaction, potential encounter contact information is provided to facilitate electronic communication between the first user system and the second user system.

18 Claims, 5 Drawing Sheets

(51) Int. Cl.
*H04L 29/08* (2006.01)
*H04W 4/06* (2009.01)
*G06Q 50/00* (2012.01)
*G06F 16/9535* (2019.01)

(52) U.S. Cl.
CPC ............ H04L 67/20 (2013.01); H04L 67/306 (2013.01); H04W 4/023 (2013.01); H04W 4/06 (2013.01)

(58) Field of Classification Search
CPC ..... H04W 84/005; H04W 4/04; H04W 4/029; H04W 92/10; H04L 67/18; H04L 51/32; H04L 67/22; H04L 51/20; H04L 65/1096; H04L 67/306; H04L 12/1813; H04L 12/1859; H04L 51/10; H04L 67/16; H04M 1/0266; H04M 1/72572; H04M 2201/38; H04M 2203/2044; H04M 2242/30; H04M 3/4228; H04M 3/42348; H04M 3/42365; H04M 1/72533; H04M 2201/50; H04M 3/567; H04M 1/72522; H04M 2250/10; H04M 2207/18; G06F 3/016; G06F 3/0488; G06F 3/04842; G06F 3/0481; G06F 3/0482
See application file for complete search history.

(56) References Cited

U.S. PATENT DOCUMENTS

| | | | | |
|---|---|---|---|---|
| 8,554,283 | B1* | 10/2013 | Behbehani | H04W 4/02 455/566 |
| 2004/0120298 | A1* | 6/2004 | Evans | H04W 8/18 370/338 |
| 2005/0038876 | A1* | 2/2005 | Chaudhuri | G06F 17/3087 709/219 |
| 2006/0270419 | A1* | 11/2006 | Crowley | H04M 3/42 455/456.2 |
| 2007/0032240 | A1* | 2/2007 | Finnegan | H04W 4/21 455/445 |
| 2007/0293212 | A1* | 12/2007 | Quon | H04M 3/42365 455/420 |
| 2008/0070593 | A1* | 3/2008 | Altman | H04W 4/029 455/457 |
| 2012/0165035 | A1* | 6/2012 | Chen | H04L 51/20 455/456.1 |
| 2012/0254764 | A1 | 10/2012 | Ayloo et al. | |

OTHER PUBLICATIONS

Lomas, Natasha, GetReal Says Stop Messaging, Just Meet, https://techcrunch.com/2015/04/22/getreal/, Apr. 22, 2015.
Lomas, Natasha, Rendeevoo is a Dating App that Cuts Straight to Cocktails, TechCrunch, https://techcrunch.com/2015/04/13/rendeevoo/, Apr. 13, 2015.
"HelloTel", a Tinder for hotel guests, aims to connect travelers USA Today, Dec. 4, 2014 https://www.usatoday.com/story/tech/2014/12/04/hotel-checkin-app/19797703/.
Safety first for new dating app Rooster RPR, Apr. 22, 2016 http://rooster.co.uk/safety-first-new-dating-app-ciao-date/.
Alchemy Dating http://www.alchemydating.com.
Tinder is testing a new feature to encourage meeting up Dating Sites Review, May 4, 2017 https://www.datingsitesreviews.com/article.php?story=tinder-testing-a-new-feature-to-encourage-meeting-up.
New 'Afridate' dating app allows users to search for match based on nationality CurlyNikki.com, Jun. 22, 2017 http://www.curlynikki.com/2017/06/new-afridate-dating-app-allows-users-to.html.
The where and when of finding new friends: analysis of a location-based social discovery network 7th AAAI Conf. on Weblogs and Social Media, 2013 https://www.aaai.org/ocs/index.php/ICWSM/ICWSM13/paper/viewFile/6095/6344 https://www.facebook.com/sartupokc/videos/1810498169205900/.
Lou, Lily, This New App Sets You up on Blind Dates—No Swiping or Messaging Required, Lifehacker, Jun. 13, 2017.

* cited by examiner

IN-PERSON ENCOUNTER SYSTEM AND METHOD OF USE

INCORPORATION BY REFERENCE

The present patent application claims priority to the provisional patent application identified by U.S. Ser. No. 62/597,551, filed on Dec. 12, 2017, the entire content of which is hereby expressly incorporated herein by reference.

BACKGROUND

In this age of technology, people are increasingly using electronic device such as mobile phones and tablets "in-the-moment" to search for things, find reviews, make purchases, and to make both social and professional connections. The trends for social connections are increasingly becoming less planned and more serendipitous, due to influence from current application providers, such as Snapchat. Even more, social and dating spaces are moving towards immediate meetings.

Currently within the art, dating application and other personal meeting applications typically running on smart phones connecting users using in application messaging systems. For example, Tinder is a dating app that works on proximity of the smart phones, but not specific location. Foursquare dating app has a feature that allows people to virtually "check in" to a specific place. HelloTel is another dating app that allows people to check in to a specific location and then broadcast that they are interested in meeting up for drinks, dinner or networking.

Studies have shown, however, that users of dating apps tend to communicate solely through in application messaging systems within the dating apps and sometimes to the exclusion of any in person communications. Even further, in using a professional platform, such as LinkedIn, users feel that communications with other users trend towards formal. As Whitney Wolfe, Founder of Bumble states, " . . . oftentimes, success comes from spontaneous connections."

As such, there is a need for a technological solution to the existing problems involved in making an in-person encounter. Ideally, the technological solution would be able to sync users at a particular location to initiate in-person communications while respecting each person's rights to privacy. It is to such a technological solution that connects users in real-time, facilitates human-to-human interactions, while protecting and respecting the privacy of each user that the present disclosure is directed.

BRIEF DESCRIPTION OF THE DRAWINGS

These and other objects and features of the present invention will be more fully disclosed or rendered obvious by the following detailed description of the invention which is to be considered together with the accompanying drawings wherein like numbers refer to like parts, and further wherein.

DETAILED DESCRIPTION OF EXEMPLARY EMBODIMENTS

Figure 1:
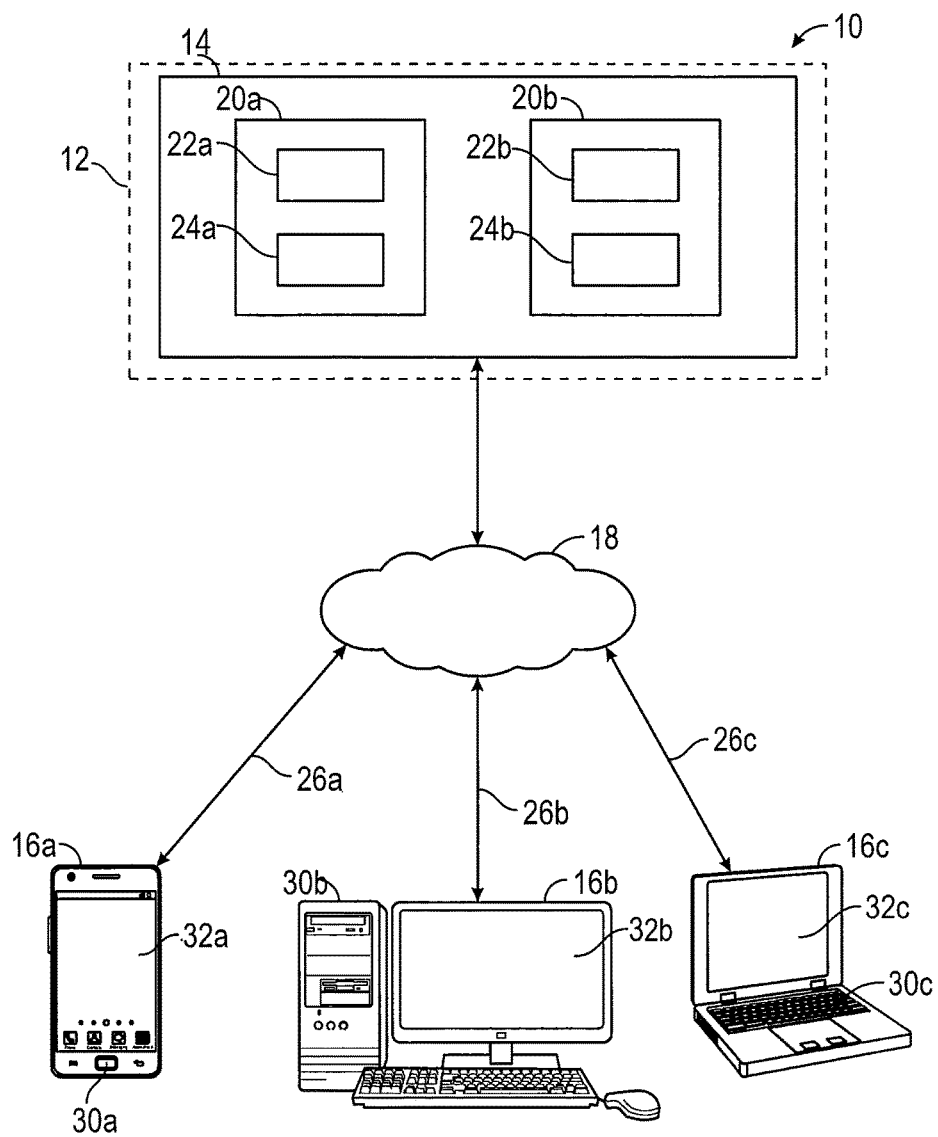
FIG. 1 illustrates a block diagram of an exemplary encounter system in accordance with the present disclosure, configured to facilitate in person communications between at least two users.

Before explaining at least one embodiment of the presently disclosed and claimed inventive concepts in detail, it is to be understood that the presently disclosed and claimed inventive concepts are not limited in their application to the details of construction, experiments, exemplary data, and/or the arrangement of the components set forth in the following description or illustrated in the drawings. The presently disclosed and claimed inventive concepts are capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail in order to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAAB-CCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Software may include one or more computer readable instructions that when executed by one or more components cause the component to perform a specified function. It should be understood that algorithms or process instructions described herein may be stored on one or more non-transitory computer readable medium. Exemplary non-transitory computer readable medium may include random access memory, read only memory, flash memory, and/or the like. Such non-transitory computer readable mediums may be electrically based, optically based, and/or the like.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Additionally, it is to further be understood that the provider and receiver as described herein are not limited to human beings, and may comprise, an animal, a thing, a computer, a server, a website, a business entity, a human, a group of humans, a virtual computer, combinations thereof, and the like, for example.

Certain exemplary embodiments of the invention will now be described with reference to the drawings. In general, such embodiments relate to connection of at least two users in real-time, facilitating a human-to-human interaction between such users, while protecting privacy of each user.

Referring to the Figures, and in particular FIG. 1, shown therein is a block diagram of an exemplary encounter system 10 to facilitate in person meeting(s) between users. Generally, the encounter system 10 is designed and configured to overcome the problems associated with dating apps' drawbacks in facilitating human-human interaction between at least two users (e.g., an in-person spontaneous conversation). For example, the encounter system 10 may notify a first user of one or more other users in close proximity, and facilitate one or more in-person communications (i.e., human-to-human interaction) at the exclusion of an initial electronic communication (e.g., telephone conversation, e-mail, text) between users. In some embodiments, the encounter system 10 may provide one or more notifications that two or more mobile platforms are in close proximity at a particular location (e.g., a public space). Proximity may be determined in a number of ways including, but not limited to, distance of the mobile platform to a particular location (e.g., restaurant, venue), distance between a first user and a second user, and/or the like. In some embodiments, the encounter system 10 solely provides location of a user to other users only upon permission of the user to provide such location. Notifications between users prior to human-to-human interaction may include, but are not limited to, personal data (e.g., name, image, date of birth), location data, and/or the like. Notifications, however, do not include any means (e.g., phone number, email address, in-app messaging services) to facilitate electronic conversations prior to an in person communication.

Generally, the encounter system 10 includes an encounter software application (e.g., mobile application) provided on a platform (e.g., mobile platform). To facilitate a personal communication between two users at a particular location, the encounter software application may permit a first user to "nudge" a second user. A nudge may be defined as one or more signals transmitted from a first encounter software application to a second encounter software application indicative of a canned request from a first user to a second user to engage in an in person communication (i.e., human-to-human interaction). The term "canned" as used herein refers to a prerecorded message lacking in freshness and spontaneity. If the second user does not want to be engaged by such interaction, the second user may reject the nudge by manipulating the second encounter software application in a manner indicating that the second user does not wish to be engaged in an in person communication. If the second user does want to engage with the first user, then the second user accepts the nudge. Once a nudge is accepted, the first user is aware that the second user is open to meeting the first user in person thus facilitating a human-to-human interaction. In some embodiments, a nudge may only be provided when users are in the same geographic location (e.g., public venue).

The encounter system 10 may facilitate use of the encounter software application by the users by providing detailed location data. Location data may include, but is not limited to, specific venues of interest, virtual reality display indicating user location, and/or the like.

Referring to FIG. 1, the encounter system 10 may be a system or systems that are able to embody and/or execute the logic of the processes described herein. Logic embodied in the form of software instructions and/or firmware may be executed on appropriate hardware. For example, logic embodied in the form of software instructions or firmware may be executed on a dedicated system or systems, a distributed system, and/or the like. In some embodiments, logic may be implemented in a stand-alone environment operating on a single processor and/or logic may be implemented in a networked environment, such as a distributed system using multiple computers and/or processors.

Referring to FIG. 1, the encounter system 10 includes a management system 12. The management system 12 may include one or more processors 14 configured to communicate with two or more user systems 16 over a network 18. The one or more processors 14 may work together, or independently to execute processor executable code. Additionally, the management system 12 may include one or more memories 20 capable of storing processor executable code. In some embodiments, each element of the management system 12 may be partially or completely network-based or cloud-based, and may or may not be located in a single location.

The one or more processors 14 may be implemented as a single or plurality of processors working together, or independently, to execute the logic as described herein. Exemplary embodiments of the one or more processors 14 may include, but are not limited to, a digital signal processor (DSP), a central processing unit (CPU), a field programmable gate array (FPGA), a microprocessor, a multi-core processor, and/or combinations thereof, for example. The one or more processors may be capable of communicating via the network 18 or a separate network (e.g., analog, digital, optical, and/or the like) via one or more ports (e.g., physical or virtual ports) using a network protocol. The one or more processors 14 may be capable of reading and/or executing processor executable code and/or capable of creating, manipulating, retrieving, altering, and/or storing data structure(s) into one or more memories (e.g., memory 20).

In some embodiments, at least a portion of the management system 12 may be network-based, cloud based, and any variations thereof, and may include the provision of configurable computational resources on demand via interfacing with a computer and/or computer network, with software and/or data at least partially located on the computer and/or computer network, by pooling processing power of two or more networked processors.

The management system 12 may read and/or execute processor executable code and/or create, manipulate, retrieve, alter and/or store data structures into one or more memories 20. The one or more memories 20 may store processor executable code. Additionally, the one or more memories 20 may be implemented as a conventional non-transitory memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In some embodiments, the one or more memories 20 may be located in the same physical location. Alternatively, one or more memories 20 may be located in a different location as the management system 12 and communicating via a network, such as the network 18. Additionally, one or more of the memories 20 may be implemented as a "cloud memory" (i.e., one or more memories may be partially or completely based on or accessed using a network, such as network 18, for example).

The one or more memories 20 may store processor executable code and/or information comprising one or more databases 22 and program logic 24. In some embodiments, the processor executable code may be stored as a data structure, such as a part of database and/or data table, for example. In some embodiments, one of the databases 22 may be a user database storing identifying characteristics retrieved and/or determined from one or more users for the encounter system 10. In some embodiments, one of the databases 22 may be a user communication database storing one or more communications received from the user system(s) 16 (e.g., nudges). In some embodiments, one of the databases 22 may be a business affiliation database storing one or more communication for transmission to one or more user system(s) 16.

In some embodiments, the program logic 24 of the management system 12 may include an application programming interfaces (API) 26 (e.g., representational state transfer (Restful Service) API) to communicate with the user system 16. It should be noted that the management system 12 may communicate with the user system 16 via other methods including, but not limited to, simple object access protocol (SOAP), direct communication, and/or the like.

The management system 12 may be capable of interfacing and/or communicating with the two or more user systems 16 via the network 18. The network 18 may be almost any type of network. For example, the network 18 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 18 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, a public switched telephone network, an Ethernet network, combinations thereof, and/or the like. Additionally, the network 18 may use a variety of network protocols to permit bi-directional interface and/or communication of data and/or information. It is conceivable that in the near future, embodiments of the present disclosure may use more advanced networking topologies.

In some embodiments, the network 18 may be the Internet and/or other network. For example, if the network 18 is the Internet, a primary user interface of the user system 16 may be delivered through a series of web pages. It should be noted that the primary user interface of the user system 16 may be replaced by another type of interface, such as, for example, a Windows-based application.

The user system 16 may be implemented as a smartphone, a tablet, a laptop computer, a personal computer, a desktop computer, a computer terminal, a computer workstation, an e-book reader, a wireless network-capable handheld device, a personal digital assistant, a kiosk, a gaming system, and/or the like. Similar to the management system 12, the user system 16 may be provided with one or more processors, one or more non-transitory processor readable medium, an input device, and an output device. The processor, the one or more non-transitory processor readable medium, the input device, and the output device of the user system 16 may be implemented similarly to or the same as the processor 14.

The user system 16 may include one or more input devices 30, and one or more output devices 32. The one or more input devices 30 may be capable of receiving information directly from a user, processor, and/or environment, and transmit such information to the one or more processors 14 and/or the network 18. The one or more input devices 30 may include, but are not limited to, implementation as a keyboard, touchscreen, mouse, trackball, microphone, fingerprint reader, infrared port, cell phone, PDA, controller, network interface, speech recognition, gesture recognition, eye tracking, brain-computer interface, combinations thereof, and/or the like.

The one or more output devices 32 may be capable of outputting information in a form perceivable by a user and/or processor(s). In some embodiments, the one or more output devices 32 may be configured to output information automatically (i.e., without human intervention). For example, in some embodiments, the one or more output devices 32 may be capable of printing or displaying at a pre-determined time interval a listing of users within a particular venue, a listing of nudges, a listing of connects, and/or the like. The one or more output devices 32 may include, but are not limited to, implementation as a computer monitor, a screen, a touchscreen, a speaker, a website, a television set, an augmented reality system, a smart phone, a PDA, a cell phone, a fax machine, a printer, a laptop computer, an optical head-mounted display (OHMD), combinations thereof, and/or the like.

In some embodiments, the user system 16 may store processor executable instructions or a software application. For example, the user system 16 may include a web browser and/or a native software application running on the user system 16 and configured to communicate with the management system 12 over the network 18. The software application on the user system 16 may be configured to access a website and/or communicate information and/or data with the management system 12 over the network 18.

Figure 2:
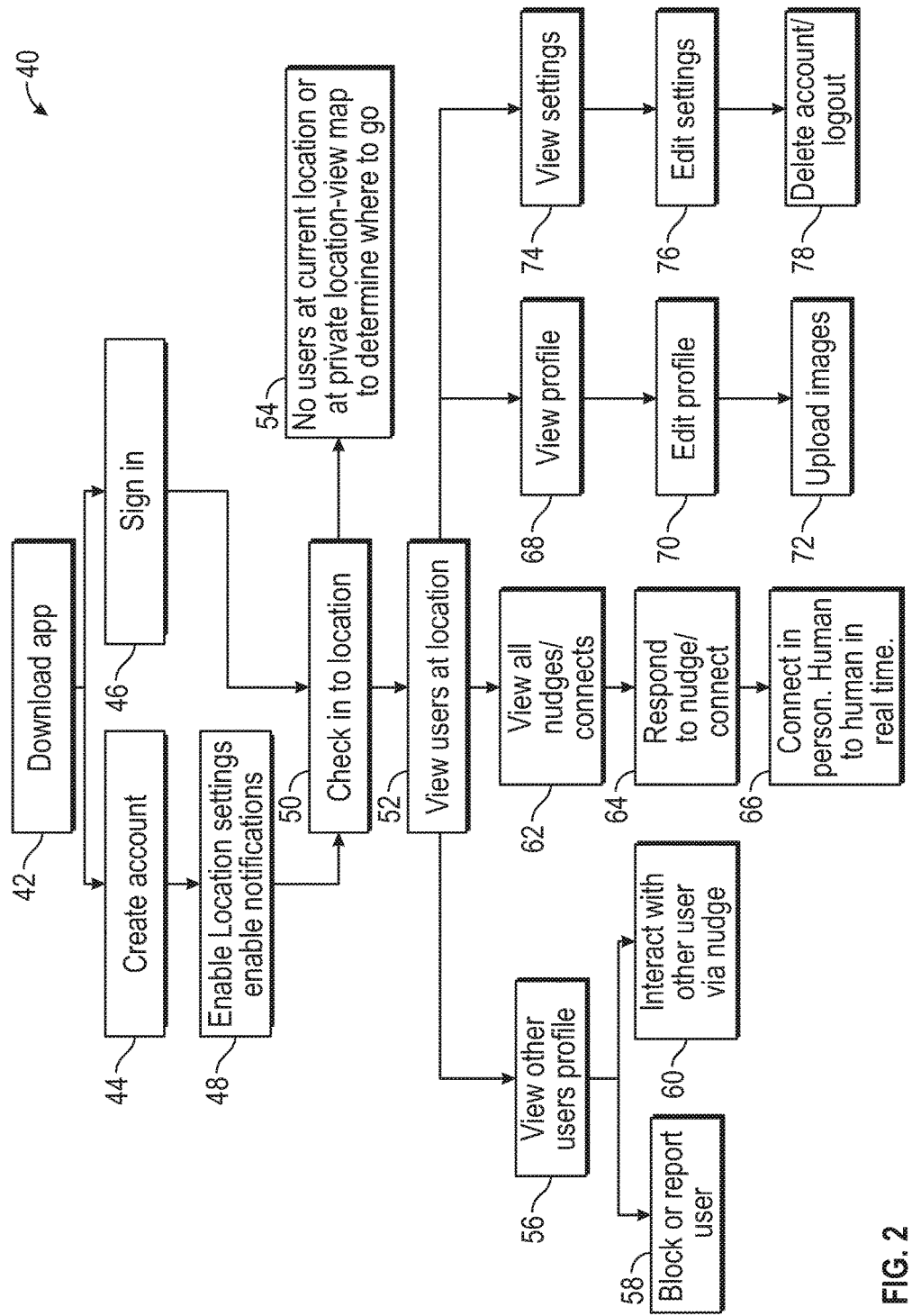
FIG. 2 illustrates a block diagram of an exemplary encounter software application for use in one or more user system of the encounter system illustrated in FIG. 1.

FIG. 2 illustrates a flow chart 40 of an exemplary embodiment of an encounter software application for the encounter system 10 for use on the user system 16 illustrated in FIG. 1. The encounter software application may be downloaded onto the one or more user systems 16 as shown in step 42. The encounter software application may provide a login-page for the user on the user system 16.

The encounter software application may provide ability for storage and management of a user account. To that end, a collection of data associated with a particular user of the encounter software application may be stored in the management system 12 in the user account. In some embodiments, at least a portion of the data associated with a particular user of the encounter software application may be stored on the user system 16 associated with the particular user. Each user account may include, but is not limited to, user name, password, history of interactions with the encounter software application, setting preferences, demographic data, and/or the like, for example.

In some embodiments, the encounter software application may provide different levels of access (e.g., premium access, basic access) to users of the user systems 16. For example, a first user may be provided with premium access providing additional features of use. To that end, the encounter software application may allow different levels of security or functionality based on compensation provided by the user.

The user may be given the option to create an account as in step 44 or sign-in to an already created account as in step 46. The user may be given the option to enable location setting and/or enable notifications via the user system 16 as in step 48. Location settings of the user system 16 may allow the user system 16 to provide the geographic location of the user system 16 to the management system 12 for use in the encounter software application as described in further detail herein. For example, in some embodiments, the user may allow the management system 12 access to location services of the user system 16. The user system 16 may relay positional data (e.g., GPS data) to the management system 12 via the API 26. The positional data may be recorded and/or stored in the one or more database 22 of the management system 12. In some embodiments, the positional data of the user may be compared to one or more public locations within proximity to the user.

During use of the encounter software application on the user system 16, the user may check-in to a location (e.g., a public location) as shown in step 50. For example, the user may be provided by the encounter software application a listing of locations within proximity to the user. The user may select one or more locations from the listing of locations within proximity to the user. As the user indicates via the user system 16 that the user is checking-in to the location, the user system 16 may provide the geographic location of the user system 16 to the encounter software application on the user system 16 and/or to the management system 12. The geographic location may be provided, for example, by an internal GPS system within the user system 16. The user location may then be stored, for example, in one or more database 22 of the management system 12.

Figure 3:
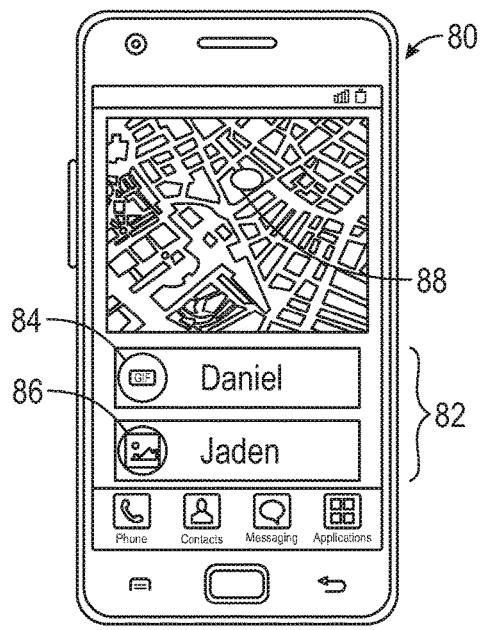
FIGS. 3-9 illustrate exemplary screenshots provided by the encounter software application in accordance with the present disclosure.

Referring to FIGS. 2 and 3, the encounter software application using the GPS location of the user system 16, may receive data indicative of a listing of other users at the same location as the user, and then provide the user with the listing of other users as shown in step 52. For example, in some embodiments, the user may check into one or more locations creating a record within one or more database 22. The management system 12 may also poll the API 26 and retrieve the user's positional data. The management system 12 may then query the one or more database 22 with the identification of position (e.g., location identification) and display one or more other users having one or more records within the one or more database 22 as being present at that location. Such "other users" may herein be identified as "potential encounters" for simplicity of description. For example, FIG. 3 illustrates a screen shot 80 for a listing 82 of a first potential encounter 84 and a second potential encounter 86 at a first venue 88. The first venue 88 is within a pre-determined geographic location as determined by the management system 12. In some embodiments, if no potential encounters are present at the user's current location or at a private location provided by the user, then the encounter software application may present to the user one or more alternate locations having potential encounters present (e.g., a map illustrating one or more locations having one or more potential encounters present) as shown in step 54.

Figure 4:
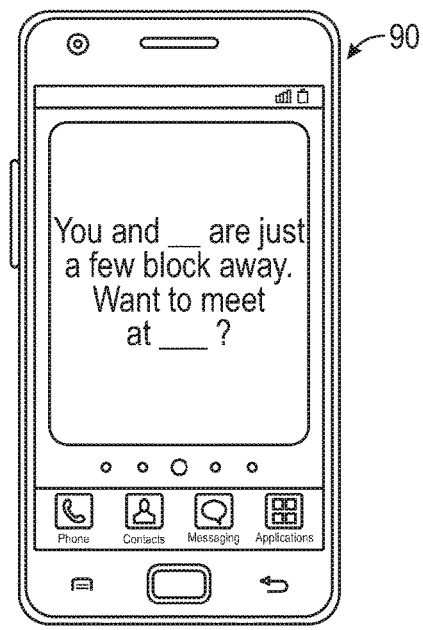
Figure 5:

In a step 56, the encounter software application may provide the user the ability to view one or more profiles of the potential encounters present at the venue. For example, the encounter software application may provide the user the ability to view the profile of the first potential encounter 84 and/or the second potential encounter 86. Viewing of the profile may be provided prior to any interaction with the potential encounter. In some embodiments, the API 26 may retrieve one or more records of users currently at a pre-defined location using positional data queries. User profiles of records determined to be at the pre-defined location may be populated and/or displayed on the user system 16. Referring to FIG. 4, in some embodiments, the encounter software application may provide the user the ability to view partial profiles (e.g., business title, blurred user image, first 100 characters of user profile, and/or the like) of potential encounters within a pre-determined vicinity of the user system 16. For example, FIG. 4 illustrates a screen shot 90 wherein the encounter software application informs the user that the user is within the vicinity (i.e., a few blocks away) of the user system 16 of one or more potential encounters. Additionally, the encounter software application may provide one or more recommendations to facilitate an in-person meeting. Such recommendations may include a particular venue, for example, at which the user and potential encounters may be able to meet. Referring to FIG. 5, in some embodiments, the encounter software application may provide the user one or more notifications when one or more potential encounters enter a particular venue or within the vicinity of the user. For example, FIG. 5 illustrates a screen shot 92 indicating that "2 new users just showed up at your location".

In some embodiments, the encounter software application may include a virtual reality feature providing users one or more views of the venue. The one or more views of the venue may include one or more indicators of one or more user systems 16 of potential encounters within a pre-determined location. Such feature may be implemented in a crowded venue, for example.

Figure 6:

In some embodiments, one or more venues and/or businesses may be affiliated with the encounter software application. To that end, locations having high attendance (i.e., greater than a number of pre-determined users present) may be highlighted (e.g. displayed) on the output device 32 to other users within the encounter software application (e.g., highlighted on a map). Highlighting may aid in promoting the venue, businesses, and/or location to one or more users. In some embodiments, businesses may affiliate with the encounter software application and select one or more geographic regions to provide users one or more notifications. For example, FIG. 6 is a screen shot 94 illustrating a business XYZ's affiliation with the encounter software application within a pre-determined geographic region. Within the pre-determined geographic region, the encounter software application provides the notification to one or more user systems 16 to "Screenshot this notification and come to XYZ tonight for $1 off your first beer."

In some embodiments, the encounter software application may provide the user an option of broadcasting the location of the user to potential encounters. For example, a recruiter may be interested in filling a particular position. The recruiter, as a user on the user system 16, may select the option to broadcast the recruiter's location at a particular venue (e.g., coffee shop) on the output device 32 of user systems 16 to potential encounters. The encounter software application may provide the user an additional option of including one or more notations related to such broadcast. For example, the recruiter may provide the notation "I'm looking for a rock star copywriter. Bring your resume to ABC for a free coffee and maybe a career change." Potential encounters on users systems 16 would be able to view the broadcast and decide whether to visit the venue broadcasted.

Figure 7:
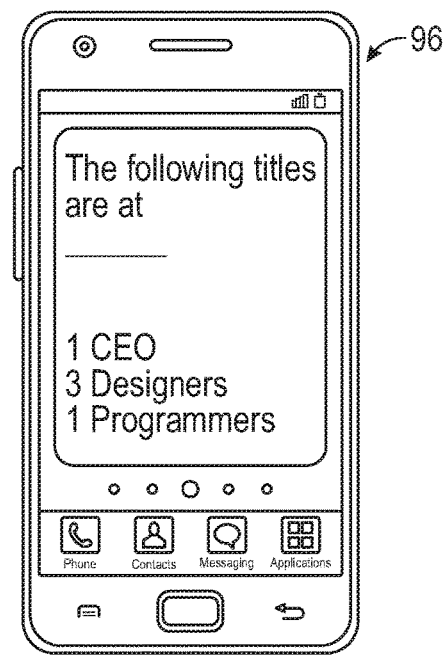

In some embodiments, the encounter software application may provide filtering of users at particular venues. While providing anonymity of users at a venue, the encounter software application may provide filtering for one or more characteristics (job title, age, and/or the like) of potential encounters. Users may then filter based on the one or more characteristics. For example, FIG. 7 illustrates a screen shot 96 provided by the encounter software application to the user system 16 indicating that 1 CEO, 3 Designers and 1 Programmer are at a particular venue. In some embodiments, the encounter software application may provide users the ability to sort profiles of potential encounters by interests, tags, titles, and/or the like. In some embodiments, the encounter software application may provide the ability for the user via the user system 16 to search and/or locate venues of interest for a particular industry, job title, role, and/or the like. For example, searching for the title "CEO" may provide one or more trends of location and time (e.g., what days, times and locations wherein users having a CEO title frequent).

In a step 58, the user may be able to block and/or report potential encounters for conduct deemed inappropriate (e.g., language, threating profile, and/or the like). In a step 60, the user may be able to initially interact with one or more potential encounters from the listing of potential encounters at the venue 88. Initially interactions may be provided via a nudge. The nudge as defined herein is a request to the first potential encounter 84 and/or the second potential encounter 86 to engage in an in person communication with the user. If the first potential encounter 84 does not want to be engaged in an in person communication, the first potential encounter 84 may reject the nudge. If the first potential encounter 84 does want to engage in an in-person communication, then the first potential encounter 84 may accept the nudge. Once a nudge is accepted, the user may be made aware that the first potential encounter 84 is open to meeting in person. In some embodiments, the encounter software application may limit nudges to a pre-determined amount within a pre-determined time period. For example, nudges may be limited to 4 nudges within a 24 hour time period. In some embodiments, the limit on nudges may be dynamic and based upon type of venue, time of day, and/or the like, for example.

If the user and potential encounter meet in person, the interaction may be deemed a "connect". The "connect" is an in-person communication between the user and the potential encounter. Following a connect, the encounter software application may provide the ability for the user and potential encounter to share contact information (e.g., phone number, e-mail). In some embodiments, the encounter software application may prompt the user to share contact information subsequent to the connect. In some embodiments, the encounter software application may provide one or more icebreakers to the user and/or the potential encounter. For example, in some embodiments, if a first user would like to share contact information with a second user, the first user would indicate to the management system 12 via the user system 16 that the first user would like to connect. The second user may receive one or more notifications (e.g., within the encounter software application, via e-mail, via text, and/or the like) with data that the first user would like to share with the second user.

Figure 8:
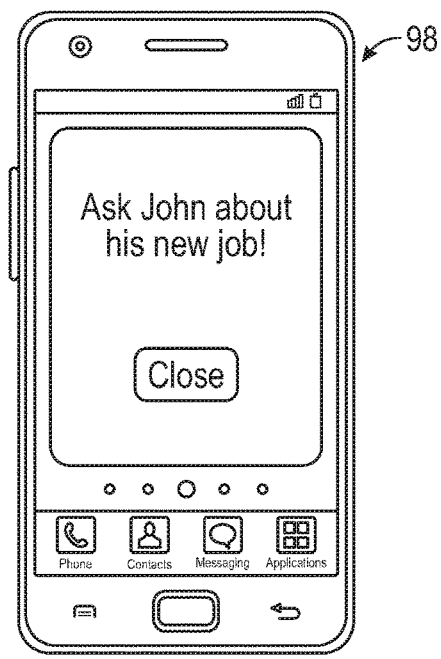
Figure 9:
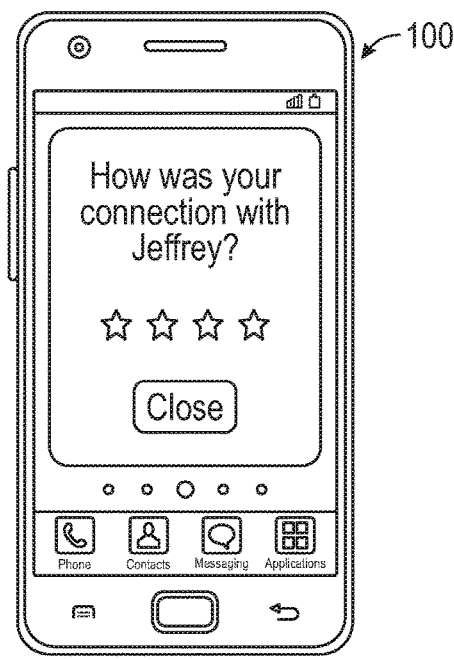

Icebreakers are notification to the user and potential encounter after the connect providing information and/or data relating to the user and potential encounter. Such icebreaker notification may include, but are not limited to, data related to social accounts, current events, geographic interest, shared interests, and/or the like. For example, FIG. 8 illustrates a screen shot 98 of an icebreaker provide to the user subsequent to the connect. The icebreaker states, "Ask John about his new job!" John being the potential encounter. In some embodiments, the icebreakers may be provided using data from third party system (e.g., LinkedIn). In some embodiments, subsequent to the connect between the users, the user and potential encounter may score and/or rank the in-person interactions as shown in a screenshot 100 in FIG. 9. In some embodiments, the encounter software application may allow the user and potential encounter to export contact information and/or data of each other subsequent to the connect. In some embodiments, one or more third parties may sponsor notifications to each user.

Each user may be able to view one or more nudges and/or connects via the user systems 16 as shown in step 62. Additionally, each user may be able to respond to one or more nudges and/or connects via the user systems 16 as shown in step 64. Subsequent to accepting a nudge from a potential encounter or having a nudge accepted, the user may be able to connect in person (i.e., a human to human interaction in real time) with the potential encounter as shown in step 66.

Each user may be able to view their profile as shown in step 68. Additionally, each user may be able to edit their profile as shown in step 70. To that end, users may be able to upload images as shown in step 72. For example, the user may upload one or more profile images, video images, and/or the like. In some embodiments, the encounter software application may prompt users to upload a different profile picture after a pre-determined amount of time or when arriving at a particular location. For example, the encounter software application may prompt a user to upload a new profile picture upon logging into the encounter software application. In some embodiments, the encounter software application may prompt a user to upload a new profile picture upon arrival at a new location or after a pre-determined amount of time at a particular location. In some embodiments, one additional feature of use may include the ability for the user to upload one or more short videos. The one or more short videos may be configured to be the user's main profile picture in an animated format (e.g., animated GIF).

Each user may be able to view one or more settings within the encounter software application via the user systems 16 as shown in step 74. Such setting may include, but aren't limited to, notification settings, location settings, and/or the like. Each user may be able to edit their settings via the user systems 16 as shown in step 76. Additionally, users may be able to delete their user account and/or log-out of the encounter software application as shown in step 78.

Figure 10:
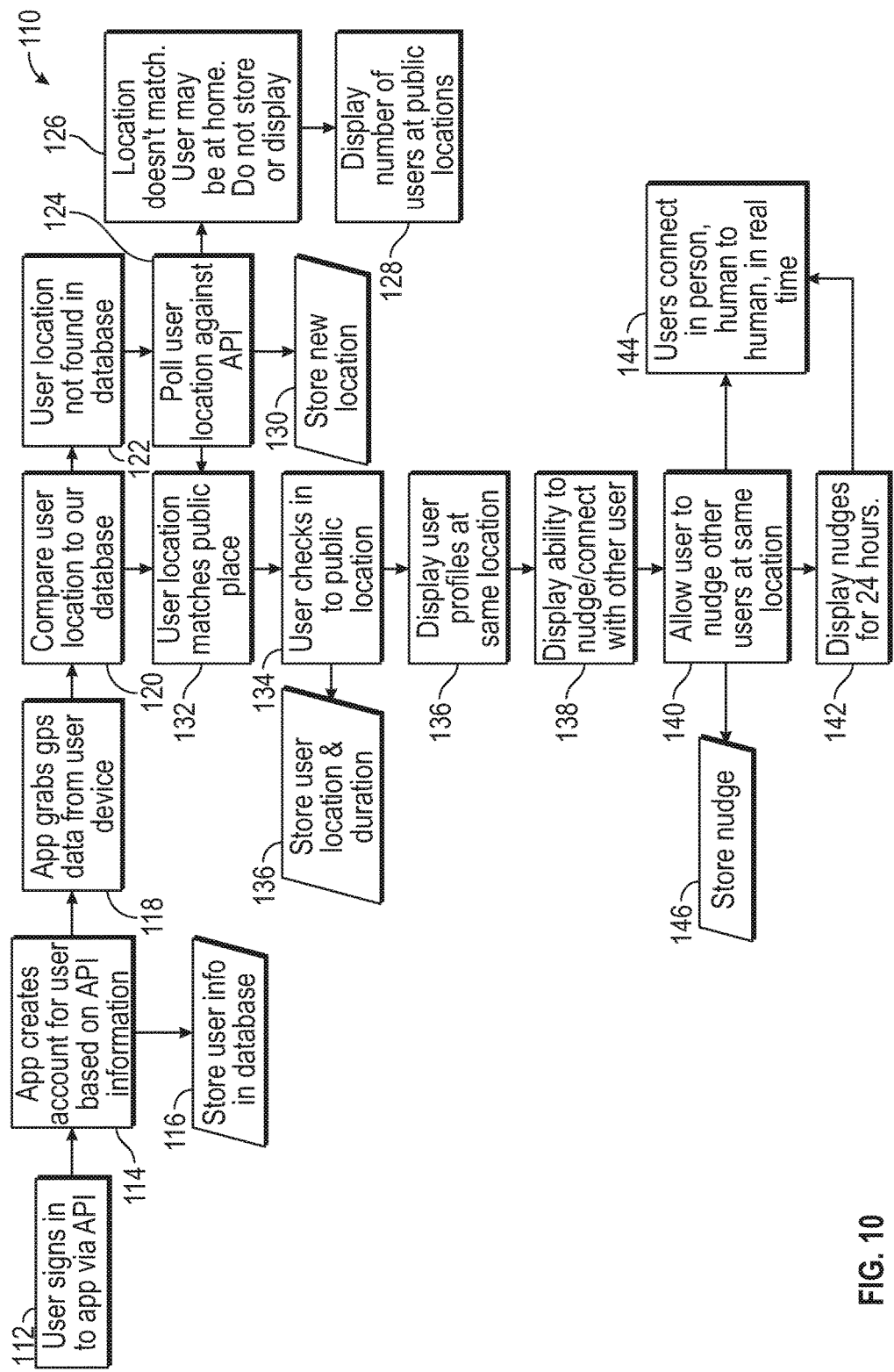
FIG. 10 illustrates a block diagram of an exemplary encounter software application for use in one or more management systems of the encounter system illustrated in FIG. 1.

FIG. 10 illustrates a flow chart 110 of the management system 12 of the encounter system 10. The management system 12 generally regulates interactions between two or more user systems 16.

In a step 112, the user using the user system 16 may sign into the encounter software application on the management system 12 via the API 26. The management system 12 may create and/or store user accounts for each user based on information and data provided by the user system 16 via the API 26 as shown in steps 114 and 116. The encounter software application may receive GPS data from the user systems 16 as shown in step 118. In a step 120, the management system 12 may compare the GPS location of the user device 16 to locations within the database of the management system 12. In one example, the GPS location of the user may be unidentifiable when comparing against the database of the management system 12 as shown in step 122. In this scenario, the management system 12 may poll the location of the user system 16 against the API 26. If the location doesn't match, the management system 12 may assume that the user is not at a public venue (e.g., the user is at home) as shown in step 126. To that end, the encounter software application may provide a display of public locations and/or users at public locations within the vicinity as shown in step 128. If the management system 12 determines the GPS location to be a valid public venue, the management system 12 may store the new location within the database as shown in step 130.

Once the management system 12 determines the GPS location is within a location capable of supporting the encounter software application (e.g., public venue) as shown in step 132, the user may be provided the option of checking into the location (e.g., sending a data signal from the user system 16 to the management system 12 indicating that the user desires to check into the location) as shown in step 134. The management system 12 may store the GPS location of the user systems 16 and/or duration of stay at the GPS location as shown in step 136.

The management system 12 may then display user profiles of users at the venue on the output device 32 of each user system 16 as shown in step 136. The management system 12 may also display on each output device 32 of the user system 16 the ability to nudge and/or connect with other users at the venue as shown in step 138. The management system 12 provides the ability for users of the user system 16 to nudge potential encounter (i.e., other users) at the venue as shown in step 140. Once the user nudges the potential encounter, the nudge may be displayed in the encounter software application to each user related to the nudge for a pre-determined amount of time (e.g., 24 hours) as shown in step 142. Users may then connect in a human to human real time communication as shown in step 144. Additionally, the management system 12 may store nudges within the database as shown in step 146.

The encounter system and methods disclosed and claimed herein are well adapted to carry out the objects and to attain the advantages mentioned herein, as well as those inherent in the invention. The present disclosure provides a non-conventional, technical solution to pre-existing problems of conventional dating applications. The problem with conventional dating applications is that meeting other users electronically has become a game. Users are able to interact electronically with other users by swiping, gathering matches like playing cards, and rarely meeting the other user in person. Conventionally, if two users do decide to meet up, these users could be completely different than what they portrayed themselves to be. With the presently disclosed and non-conventional encounter software application, users are able to see if there are other users at different locations in close proximity, e.g., across their city. But, the encounter software application does not allow the users to see who the other users are until the users are at the same location. Once users are at the same location, profiles (or partial profiles) may be available and such users are able to initially interact via "nudges". Nudges are different from conventional electronic communication between two users for several reasons. First, in some embodiments, nudges are only available when two users are at the same location. Second, the nudge represents a simple canned message, such as "hello, I'd like to visit with you." The presently disclosed encounter software application does not allow direct spontaneous messaging until after the users meet in person. Nudges take the place of direct messaging and encourage two users to meet in person while the users are at the same location. In some embodiments, once a user leaves the location, such user can not receive a Nudge from a user still at the location. In summary, the presently disclosed encounter software application solves the previous problems associated with spontaneous electronic communication between users of dating applications, by facilitating real-time, location based, in person interactions rather than digital messaging across vast distances.

While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. One or more non-transitory computer readable medium storing a set of computer executable instructions of an encounter software application for running on one or more processors that when executed cause the one or more processors to facilitate an in-person communication between two users at an exclusion of an initial spontaneous electronic communication by:

receiving location data for a first user system, and a second user system, the first user system having a first processor, a first non-transitory processor readable medium, a first input device and a first output device, the second user system having a second processor, a second non-transitory processor readable medium, a second input device, and a second output device, the first user system and the second user system being wireless network-capable mobile devices;

determining if the first and second user systems are within a pre-determined geographic area using the location data;

providing a notification to the first user system of at least one of personal data and location data of a user of the second user system, without any means to facilitate electronic conversations between the first user system and the second user system prior to the in-person communication;

receiving a request from the first user system to send a canned request to the second user system, the canned request being one or more signals indicative of a message lacking in freshness and spontaneity to engage in an in-person communication, the canned request being configured to be accepted or rejected;

displaying the message of the canned request on the second output device of the second user system;

receiving acceptance of the canned request to engage in an in-person communication from the second user system; and requesting at least one of the first user system, and the second user system to upload a different profile image when at least one or more of the following occurs: location data changes; after a pre-determined amount of time; when arriving at a particular location; a user of the first user system logging into the encounter software application, a user of the second user system logging into the encounter software application; upon arrival at a new location; or after a predetermined amount of time at a particular location, the profile image being a picture or short video of the user.

2. The one or more non-transitory computer readable medium storing a set of computer executable instructions for running on one or more processors of claim 1, further comprising storing a user account related to each user of each user system, the user account having a profile image, the profile image being a picture or short video of the user.

3. The one or more non-transitory computer readable medium storing a set of computer executable instructions for running on one or more processors of claim 1, further comprising requesting the first user system and the second user systems to upload a different profile image at pre-determined intervals, the profile image being a picture or short video of the user.

4. The one or more non-transitory computer readable medium storing a set of computer executable instructions for running on one or more processors of claim 3, wherein the pre-determined intervals is a twenty-four hour period.

5. The one or more non-transitory computer readable medium storing a set of computer executable instructions for running on one or more processors of claim 1, further comprising transmitting to at least one of the first and second user systems at least one notification indicating that the first and second user systems are each in close proximity to a specific location.

6. The one or more non-transitory computer readable medium storing a set of computer executable instructions for running on one or more processors of claim 1, further comprising providing a virtual reality display to at least one of the first and second user systems, wherein the virtual reality display identifies at least one of the first and second user system within the pre-determined geographic area.

7. The one or more non-transitory computer readable medium storing a set of computer executable instructions for running on one or more processors of claim 1, further comprising receiving a request from the first user system to view at least one of personal data and location data of the user of the second user system, the personal data including personal information related to the user of the second user system, and excluding contact information.

8. The one or more non-transitory computer readable medium storing a set of computer executable instructions for running on one or more processors of claim 1, further comprising storing at least one communication of a business affiliation related to the pre-determined geographic area.

9. The one or more non-transitory computer readable medium storing a set of computer executable instructions for running on one or more processors of claim 1, further comprising receiving a broadcast and transmitting the broadcast to the first and second user systems deemed within the pre-determined geographic area.

10. The one or more non-transitory computer readable medium storing a set of computer executable instructions for running on one or more processors of claim 1, further comprising providing to the first user system at least one list including the second user systems within the pre-determined geographic area and filtering the at least one list based on job title of each user.

11. The one or more non-transitory computer readable medium storing a set of computer executable instructions for running on one or more processors of claim 1, further comprising providing at least one icebreaker to at least one of the first and second user systems subsequent to receiving confirmation of a connect, the icebreaker including personal data related to at least one user.

12. The one or more non-transitory computer readable medium storing a set of computer executable instructions for running on one or more processors of claim 11, wherein the icebreaker includes data received from a third party system.

13. An automated method performed by at least one processor running computer executable instructions of an encounter software application stored on at least one non-transitory computer readable medium, comprising:

receiving location data from a first user system and a second user system of a potential encounter, the first user system and the second user system being wireless network-capable mobile devices;

requesting at least one of the first user system, and the second user system to upload a different profile image when at least one or more of the following occurs: location data changes; after a pre-determined amount of time; when arriving at a particular location; a user of the first user system logging into the encounter software application, a user of the second user system logging into the encounter software application; upon arrival at a new location; or after a predetermined amount of time at a particular location, the profile image being a picture or short video of the user;

determining if the location data from the first user system and the second user system is within a venue;

facilitating an in-person communication between two users at an exclusion of an initial spontaneous electronic communication by:

providing a notification to the first user system of at least one of personal data and location data of the user of the second user system, without electronic contact information to facilitate electronic conversations between the first user system and the second user system prior to the in-person communication;

providing a canned request to engage in an in-person communication to the first user system responsive to the first user system and the second user system being within a venue;

receiving confirmation from the first user system of the canned request to engage in the in-person communication for the potential encounter;

receiving confirmation from at least one of the first user system and the second user system of a human-to-human interaction between users of the first user system and the second user system; and, providing electronic contact information for the users subsequent to receiving confirmation of the human-to-human interaction.

14. The automated method of claim 13, further comprising displaying a listing of potential encounters to the first user system, each potential encounter located within the venue.

15. The automated method of claim 13, further comprising filtering the listing of potential encounters by using job title.

16. The automated method of claim 13, further comprising requesting profile images from the first user system at pre-determined geographic intervals.

17. An automated system for facilitating human-to-human interaction, comprising:

at least one processor executing an encounter software application facilitating an in-person communication between two users at an exclusion of an initial spontaneous electronic communication by receiving:

determining if first and second user systems are within a pre-determined geographic area using location data;

receiving a request from the first user system to send a canned request to the second user system, the canned request being one or more signals indicative of a message lacking in freshness and spontaneity to engage in an in-person communication, the canned request being configured to be accepted or rejected;

displaying the message of the canned request on the second output device of the second user system;

confirmation of a request to meet from a first user system, the first user system being a first wireless network-capable mobile device;

receiving confirmation of the canned request to meet in person from the second user system, the second user system being a different wireless network-capable mobile device than the first user system;

receiving confirmation of a human-to-human interaction between users of the first user system and the second user system; and, at least one database storing electronic contact information for users of the first user system and the second user system;

wherein the encounter software application executed by the processor provides a notification of at least one of personal identification of each user of the first user system and the second user system, or location data of at least one of the first user system and the second user system, excluding the electronic contact information, to facilitate the in-person communication prior to confirmation of the human-to-human interaction between users of the first user system and the second user system; and wherein at least one of the first user system, and the second user system is requested to upload a different profile image when at least one or more of the following occurs: location data changes; after a pre-determined amount of time; when arriving at a particular location; a user of the first user system logging into the encounter software application, a user of the second user system logging into the encounter software application; upon arrival at a new location; or after a predetermined amount of time at a particular location, the profile image being a picture or short video of the user.

18. The automated system of claim 17, wherein the encounter software application executed by the processor provides electronic contact information for each user to the first user system and the second user system subsequent to confirmation of the human-to-human interaction between users of the first user system and the second user system.

* * * * *